United States Patent
Najman et al.

(10) Patent No.: US 7,251,349 B2
(45) Date of Patent: Jul. 31, 2007

(54) AUTOMATIC TABLE LOCATING TECHNIQUE FOR DOCUMENTS

(75) Inventors: Laurent Alain Najman, Paris (FR); Mickael Bernard L. Barbey, Courbevoie (FR)

(73) Assignee: Oce Print Logic Technologies S.A., Venlo (NL)

( * ) Notice: Subject to any disclaimer, the term of this patent is extended or adjusted under 35 U.S.C. 154(b) by 831 days.

(21) Appl. No.: 10/079,513

(22) Filed: Feb. 22, 2002

(65) Prior Publication Data

US 2002/0154818 A1 Oct. 24, 2002

(30) Foreign Application Priority Data

Feb. 22, 2001 (EP) .................................. 01400470

(51) Int. Cl.
*G06K 9/00* (2006.01)
*G06K 9/34* (2006.01)

(52) U.S. Cl. ...................... 382/113; 382/175
(58) Field of Classification Search ................. 382/113, 382/175, 317; 715/509
See application file for complete search history.

(56) References Cited

U.S. PATENT DOCUMENTS

| | | | | |
|---|---|---|---|---|
| 5,091,964 A * | 2/1992 | Shimomura | .................. | 382/174 |
| 5,129,012 A * | 7/1992 | Abe | ........................... | 382/190 |
| 5,181,255 A * | 1/1993 | Bloomberg | .................. | 382/176 |
| 5,502,777 A * | 3/1996 | Ikemure | ...................... | 382/173 |
| 5,548,415 A * | 8/1996 | Tanaka et al. | .............. | 358/462 |
| 5,680,478 A | 10/1997 | Wang et al. | | |
| 5,774,584 A | 6/1998 | Matsumoto et al. | | |
| 5,784,487 A * | 7/1998 | Cooperman | .................. | 382/175 |
| 6,055,036 A * | 4/2000 | Takahashi | ...................... | 355/25 |
| 6,137,905 A | 10/2000 | Takaoka | | |
| 6,757,870 B1 * | 6/2004 | Stinger | ........................ | 715/513 |
| 6,816,630 B1 * | 11/2004 | Werth et al. | ................. | 382/287 |

OTHER PUBLICATIONS

Arias, Juan F. et al., "A Practical Application of Graphics Recognition: Helping with the Extraction of Information from Telephone Company Drawings", NYNEX Science and Technology, pp. 273-279.

(Continued)

*Primary Examiner*—Bhavesh M Mehta
*Assistant Examiner*—Damon Conover
(74) *Attorney, Agent, or Firm*—Birch, Stewart, Kolasch & Birch, LLP

(57) ABSTRACT

Table-like structures in documents are located by analysis of sub-regions (crops) on the document. The analysis involves determining the location of lines having lengths above a certain threshold and assigning these lines to groups. A set of adjacent lines is assigned to a common group if the separation between adjacent pairs of lines within the set is less than a threshold value. The crop selected as the location of the table-like structure is that having a group with the greatest number of lines. When the technique is applied to locating title blocks in technical drawings, it is preferred to analyze crops corresponding to the corners or ends of the document. The analysis is also applicable to an image of the document produced at a reduced resolution.

19 Claims, 7 Drawing Sheets

OTHER PUBLICATIONS

Chen, Jiun-Lin, "An Efficient Algorithm for Form Structure Extraction Using Strip Projection", Pattern Recognition, vol. 31, No. 9, 1998, pp. 1353-1368.

Lopresti, Daniel et al., "Automated Table Processing: An (Opinionated) Survey", 3$^{rd}$ IAPR Intl. Wkshp. On Graphics Recognition, 1999, pp. 109-134.

Syeda-Mahmood, Tanveer, "Extracting Indexing Keywords from Image Structures in Engineering Drawings", IEEE, Jul. 1999, pp. 471-474.

Chhabra, Atul K. et al., "Detection of Horizontal Lines in Noisy Run Length Encoded Images: The FAST Method", NYNEX Science & Technology, pp. 35-48.

Casey R. et al "Intelligent Forms Processing System", Machine Vision and Applications, vol. 5, 1992, pp. 143-155.

Syeda-Mahmood, Tanveer "Locating Indexing Structures in Engineering Drawing Databases Using Location Hashing", 1999 IEEE Computer Society Conference on Computer Vision and Pattern Recognition, vol. 1, Jun. 1999, pp. 49-55.

\* cited by examiner

Top-left corner profile

Top-right corner profile

Bottom-left corner profile

Bottom-right corner profile

AUTOMATIC TABLE LOCATING TECHNIQUE FOR DOCUMENTS

RELATED APPLICATION

The present application claims the priority benefit of European Application No. 01400470.9 filed Feb. 22, 2001, which is herein fully incorporated by reference.

BACKGROUND OF THE INVENTION

1. Field of Invention

The present invention relates to the automatic locating of table-like structures present in documents or the like.

2. Description of the Related Art

There are many instances in which it would be advantageous to be able to detect automatically the location of tables present in documents or the like. One example is in form processing: it is desirable to be able to locate automatically cells in tables on the forms, so that database entries can be generated automatically by reading data in the cells.

Various proposals have been made in this field. However, the majority of form-recognition computer programs currently available in the market rely on the recognition of forms in constrained poses within images consisting of mainly the form itself.

The automatic table location technique is of particular interest in the field of processing technical drawings (such as mechanical engineering drawings or architectural drawings). In the latter field, if the title block of the drawing can be located automatically, then the following processes can be realized:

the drawing can be folded automatically such that the title block remains visible, the drawing can be positioned in the correct orientation, since the title block generally is located in a specified corner with respect to the image, for example, bottom right, in the processing of scanned images of drawings, for example using a personal computer, the title block can be displayed at an enlarged scale to assist in manual indexing, and a first step in the automatic indexing of drawings can be taken since once the title block has been located, it is then simply a question of extracting the information contained therein.

Various standards have been defined at national and international level, governing the content and positioning of title blocks (legends) in technical drawings. These standards include ISO 5457 and ISO 7200 and French national standard NF E 04-503.

According to the standard ISO 7200, the legend is a table-like form composed of various rectangular cells or "fields" located within the page. The cells contain information and three fields are compulsory wherein the fields include:

(1) an identification zone giving an identification number or code to the drawing, (2) a title zone, and (3) a zone containing the name of the drawing's owner.

According to the standard ISO 5457, the identification portion of the title block needs to be at the right-hand bottom corner of the title block when it is seen in its normal direction of viewing, and need to have a maximum length of 170 mm. According to the French standard NF E 04-503, the dimensions of the title block should not exceed 190 mm in width and 277 mm in height.

The standard ISO 5457 also specifies that "the position of the title block should be within the drawing space such that the portion of the title block containing the identification of the drawing (registration number, title, origin, etc.) is situated in the bottom right-hand corner of the drawing space, both for sheets positioned horizontally, type X (see FIG. 1a)), or vertically, type Y (see FIG. 1b)). The direction of viewing of the title block should correspond in general to that of the drawing. Nevertheless, in order to economise on preprinted drawing sheets, it is permitted to use sheets type X in the vertical position (see FIG. 1(c)) and sheets type Y in the horizontal position (see FIG. 1(d)). In these cases, the identification portion of the title block should be in the right-hand top corner of the drawing space, and orientated such that the title block may be read when viewed from the right."

It will be seen that the standards allow some latitude in the positioning of title blocks in technical drawings. Moreover, the standards are constantly evolving and technical drawings do not always comply with the rules defined in these standards. There is particular variability where old drawings are concerned. Thus, conventional techniques for locating a table or cell used by form recognition software are not suitable for locating a title block in drawings.

Usually, technical drawings have borders, a filling margin for taking perforations, a frame for limiting the drawing space, and centering and orientation marks to indicate positioning and orientation. However, no reliance can be placed on these features since they are not always present. Moreover, the title block locating process generally is performed based on scanned images of technical drawings and the above-mentioned features may be absent from the scanned image due to bad positioning of the drawing during the scanning. Thus, the title block locating process should be performed based upon other factors.

A paper "Automated Table Processing: An (Opinionate(d) Survey" by D. Lopresti and G. Nagy, from Proceedings of GREC'99, pp. 109-134, shows that, where cell location in tables is concerned, in general, it is necessary to extract the table structure from an image of the document by discerning the lines defining the boundaries of the cells. Such methods are not directly applicable to locating title blocks in technical drawings.

"An efficient algorithm for form structure extraction using strip projection" by J-L Chen and H. J. Lee, appearing in "Pattern recognition", vol. 3, no.9, pp. 1353-1368 (1998) proposes a method for extracting the structure of a table from an image. However, this technique is not adapted for locating specific structures, such as legends on technical drawings.

"Extracting Indexing Keywords from Image Structures in Engineering Drawings" by T. Syeda-Mahmood, from the Proceedings of ICDAR'99, pp. 471-474 (1999) specifically deals with the problem of title block locating process in technical drawings and subsequent extraction of information from the title block. A "location hashing" method is employed to find specific two-dimensional structures. However, this technique is complex and has the disadvantage of requiring a learning phase to establish a model for each structure that is to be located. Thus, this method is not suitable given the variability inherent in technical drawings.

In the present inventor's earlier French patent application number 00 03639 filed on Mar. 22, 2000, the problem of locating title blocks is solved based on a new method for table-like form processing. However, once again this method has a limitation of requiring a model for each different type of title blocks to be located.

A title block locating method is proposed in "A Practical Application of Graphics Recognition: Helping with the Extraction of Information from Telephonic Company Drawings" by J-F. Arias, A. Chhabra and V. Misra, in Proceedings of GREC'97, pp. 273-279 (1997). This method is based on the FAST method described in "Detection of Horizontal Lines in Noisy Run Length Encoded Images: The FAST method" by A. Chhabra, V. Misra and J-F. Arias, in "Graphics Recognition—Methods and Applications" ed.R. Kasturi and K. Tombre, Lecture Notes in Computer science, vol. 1072, pp. 35-48, Springer-Verlag, Berlin, Germany, 1996, which allows the extraction of straight lines from a crop of a drawing. After these straight lines have been extracted, the cells that are not empty are detected. The title block is located by detecting the cell with the largest area that also meets certain width-to-height ratio conditions. This overall technique is specific to documents in which the cells have particular dimensions, and thus is not useful in cases where there is likely a variation in cell size, such as in title blocks in technical drawings.

SUMMARY OF THE INVENTION

Accordingly, the present invention overcomes the problems and disadvantages associated with the related art methods of table location. Particularly, preferred embodiments of the present invention provide robust table-location methods and apparatus in which specific tables present on a document can be located reliably and quickly. The techniques of the present invention involve the analysis of sub-regions of the document, where these sub-regions are termed "crops" of the document.

In accordance with an embodiment, the present invention provides a method for automatically locating tables in documents, the method comprising the steps of defining a plurality of crops of the document; for each crop of the document, determining the location of lines whose length is greater than or equal to a predetermined threshold value; evaluating a parameter indicative of the density of the lines; and deciding which one of the plurality of crops includes the location of the table based on the evaluated parameter.

The detected image lines correspond to the lines making up the image and not to the pixels of the background colour of the medium on which the image is presented. The length of the detected lines may be determined in any convenient way. For example, in the case where the processed document is scanned and where the scanned image that is analyzed, it can be convenient to count the number of image pixels present on the different scan lines. As another example, in the case where an image of the document is analyzed under an HPGL (Hewlett-Packard Graphics Language) representation, the data is in vector format and the vector information includes data on the length of the lines making up the image. Clearly, the length of a detected line may be represented in any convenient way, for example, in terms of the number of image pixels making up the line, in terms of conventional units of measurement (centimeters, millimeters), etc.

The evaluated parameter indicative of density of detected lines may be the number of detected lines within groups defined for each crop, lines being assigned to a common group if the separation between adjacent pairs of these lines is less than a reference value. The decision process may also include consideration of the thickness of the detected lines in the different crops.

In the case where the automatic table-locating method of the invention is applied to the location of title blocks in technical drawings, it is advantageous that the plurality of crops should correspond to the respective corners or ends of the document.

It has been found that the speed of the table-locating method according to the invention improves if the process is applied to an image of the document at a reduced resolution. Moreover this also renders the method more robust.

The method according to the present invention is based on signal measurements from the entire document. Moreover, it involves evaluation of a relatively small number of parameters, each of which has a physical meaning. Accordingly, it is robust and reliable. Furthermore, it is fast enough to be integrated into automatic document-processing devices.

Preferred embodiments of the method according to the present invention applied to automatically locating title blocks in technical drawings in A4 format have given a recognition rate of 98%, with no incorrect indication of legend location, and a recognition rate of 82% for drawings in A0 to A3 formats, with only 2% of incorrect indication of legend location.

The present invention further provides an apparatus for automatically locating tables in documents by application of the above-mentioned method.

These and other objects of the present application will become more readily apparent from the detailed description given hereinafter. However, it should be understood that the detailed description and specific examples, while indicating preferred embodiments of the invention, are given by way of illustration only, since various changes and modification within the spirit and scope of the invention will become apparent to those skilled in the art from this detailed description.

BRIEF DESCRIPTION OF THE DRAWINGS

Further features and advantages of the present invention will become clear from the following description of detailed embodiments thereof, given by way of example, and illustrated by the accompanying drawings, in which:

FIG. 1(a) shows a type X document in its usual, horizontal orientation,

FIG. 1(b) shows a type Y document in its usual, vertical orientation,

FIG. 1(c) shows a type X document orientated vertically, and

FIG. 1(d) shows a type Y document orientated horizontally;

FIGS. 4(a)-4(d) show projection profiles (corresponding to the numbers of black pixels per line) in the respective corners of the technical drawing shown in FIG. 2, in which:

FIG. 4(a) shows the projection profile corresponding to the top left-hand corner of the drawing in FIG. 2, FIG. 4(b) shows the projection profile corresponding to the top right-hand corner of the drawing in FIG. 2, FIG. 4(c) shows the projection profile corresponding to the bottom left-hand corner of the drawing in FIG. 2, and FIG. 4(d) shows the projection profile corresponding to the bottom right-hand corner of the drawing in FIG. 2;

FIGS. 8A and 8B illustrate steps of algorithms used in a title-block locating method embodying the present invention, in which:

FIG. 8A is a flow diagram illustrating one algorithm for generating parameters indicative of the density of lines in analyzed crops, and FIG. 8B is a flow diagram illustrating one preferred algorithm for deciding which one of a plurality of analyzed crops contains the title block of a technical drawing.

DETAILED DESCRIPTION OF THE PREFERRED EMBODIMENTS

Figure 1A:
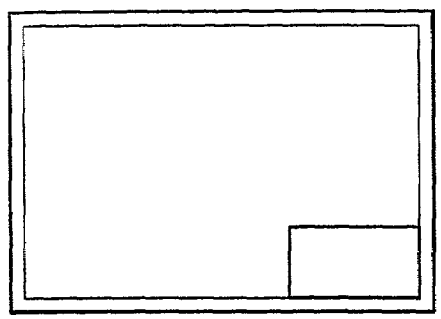
FIGS. 1(a)-1(d) show different positioning of title blocks in technical drawings according to the international standard ISO 5457, where.
Figure 1B:
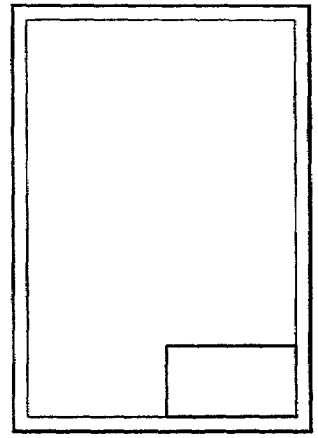
Figure 1C:
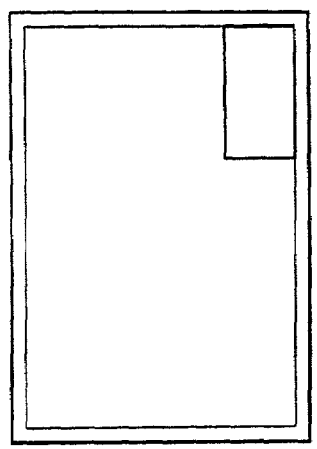
Figure 1D:
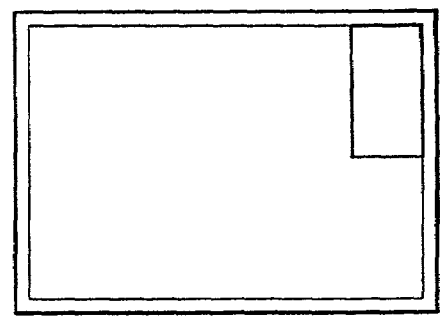

The following description of the preferred embodiments of the present invention relates to title block locating techniques for drawings such as technical drawings. However, it is to be understood that the techniques of the present invention are not limited to such, but are equally applicable in general to locating tables or table-like structures in documents or other table-block containing mediums. The tables or table-like structures may be, for example, the whole or parts of tables present on forms where a "table" here is a two-dimensional assembly of cells. The present invention is of particular interest with regard to the automatic locating of title blocks (or "legends") in technical drawings. In the present document, the term "table" is used to designate all of the aforementioned examples, and table-like structures in general.

Characteristics of the main analytical steps of the method according to a first preferred embodiment of the invention will now be described with reference to FIGS. 2 to 8B.

The present inventors have found that the title block in a technical drawing generally possesses the following characteristics:

it is a type of table (assembly of cells) where the overall assembly has a width of greater than 10 cm and a height between 4 cm and 28 cm;

the height of the component cells is usually between about 0.5 cm and 3 cm; and it is located in one of the corners of the drawing, generally the bottom right-hand corner when seen in the normal direction for reading the contents of the title block.

These observations have led the inventors to invent a title-block locating technique of the present invention based upon analysis of respective sub-regions corresponding to the corners or ends of the drawing. As mentioned above, each such sub-region can be termed a "crop" of the image of the drawing. For example, in the case of the technical drawing illustrated in FIG. 2, crops, corresponding to the corners of the drawing, may be identified as illustrated in FIG. 3. More particularly, the technical drawing shown in FIG. 2 is an A0 document and the crop width for each crop illustrated in FIG. 3 is 18 cm and the crop height is 13 cm.

In the first preferred embodiment of the invention, crops corresponding to the corners of a drawing are analyzed by evaluating the number of black pixels present on each horizontal line. This analysis is generally performed by a personal computer or other processor means based upon a scanned image of the drawing in, for example, TIFF (Tagged Image File Format). It is convenient if the evaluated number of black pixels is represented by the length of a line that would be formed by placing this number of black pixels side-by-side. A plot of the evaluated line length with respect to the vertical position of the corresponding horizontal line is herein termed a "projection profile".

Figure 2:
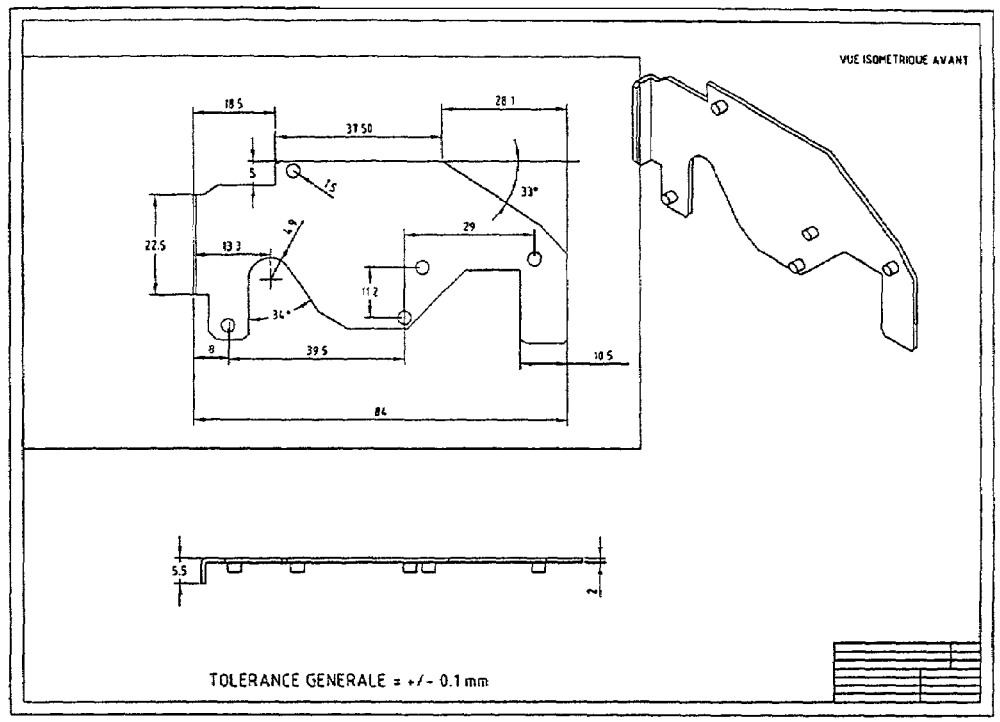
FIG. 2 shows an example of a general technical drawing.
Figure 3:
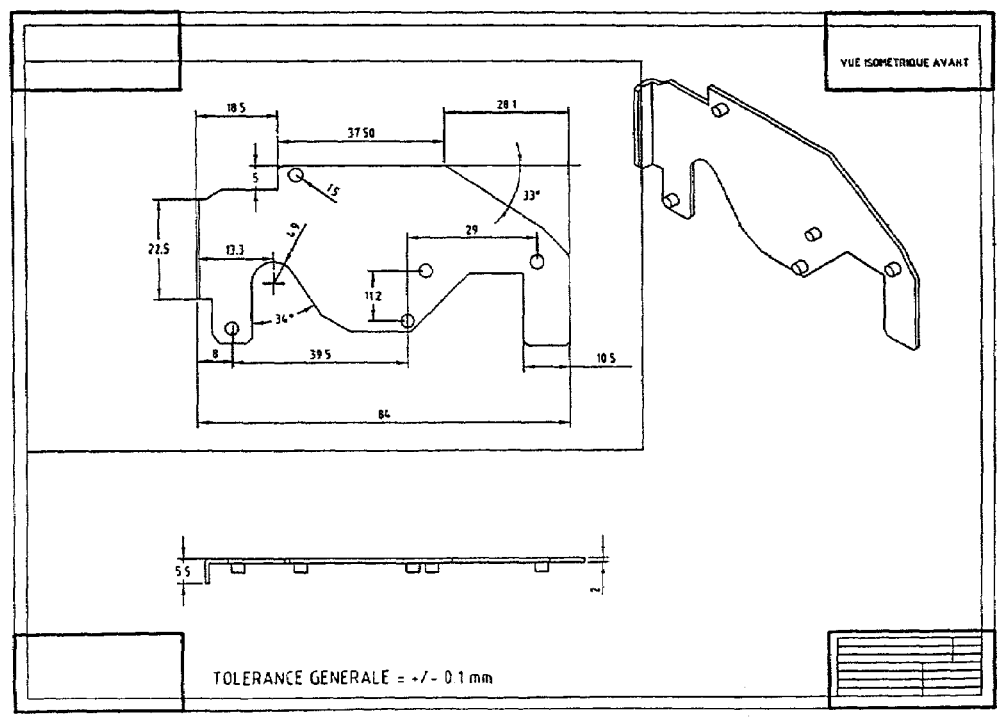
FIG. 3 identifies crops corresponding to the respective corners of the technical drawing shown in FIG. 2.
Figure 4A:
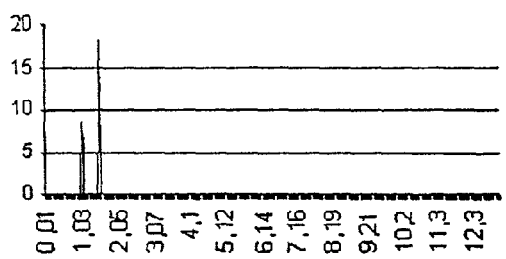
Figure 4B:
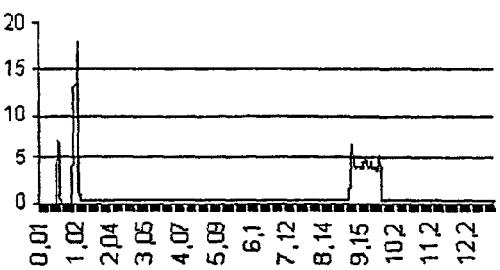
Figure 4C:
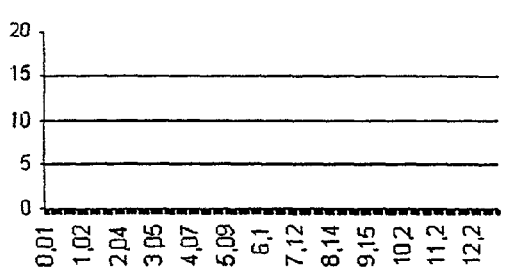
Figure 4D:
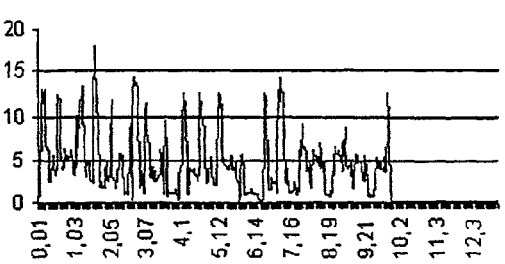

FIGS. 4(a)-4(d) show projection profiles calculated for the four crops identified in FIG. 3 based on the drawing shown in FIG. 2. In this example, the corner that contains the title block is the bottom right-hand corner of the drawing in FIG. 2. It will be seen that the projection profile of this corner, as shown in FIG. 4(d), contains a large number of peaks that are spaced apart in a substantially regular fashion. This corresponds to a large number of relatively long lines that are spaced apart in a regular fashion.

According to the first preferred embodiment of the invention, a determination is made as to which crop of the drawing corresponds to or contains the title block of the drawing based upon the peaks in the projection profiles determined for the different crops. This amounts to a detection of long lines in the image of each crop. The steps of this determination process according to this embodiment are summarized in the flow diagrams of FIGS. 8A and 8B, in which FIG. 8A shows the steps involved in identifying long lines and evaluating parameters indicative of the density of long lines in each crop and FIG. 8B illustrates a preferred algorithm for determining which crop contains the title-block based upon the evaluated parameters.

First, it can be helpful to eliminate certain crops from consideration. For example, in the case of locating a title block in technical drawings in A0 to A3 format, the title block is almost always located in the top-left or bottom right corner of the drawing. Accordingly, the decision algorithm can be speeded up by eliminating the other corners from consideration. This can be done, for example, by setting the value of a parameter N, representing the total number of crops to analyze, to less than the total number of crops, and assigning values of the index n of crops to analyze only those crops that are likely candidates (i.e. top-left and bottom-right), or simply by not defining crops for the unlikely corners in the first place.

Figure 8A:
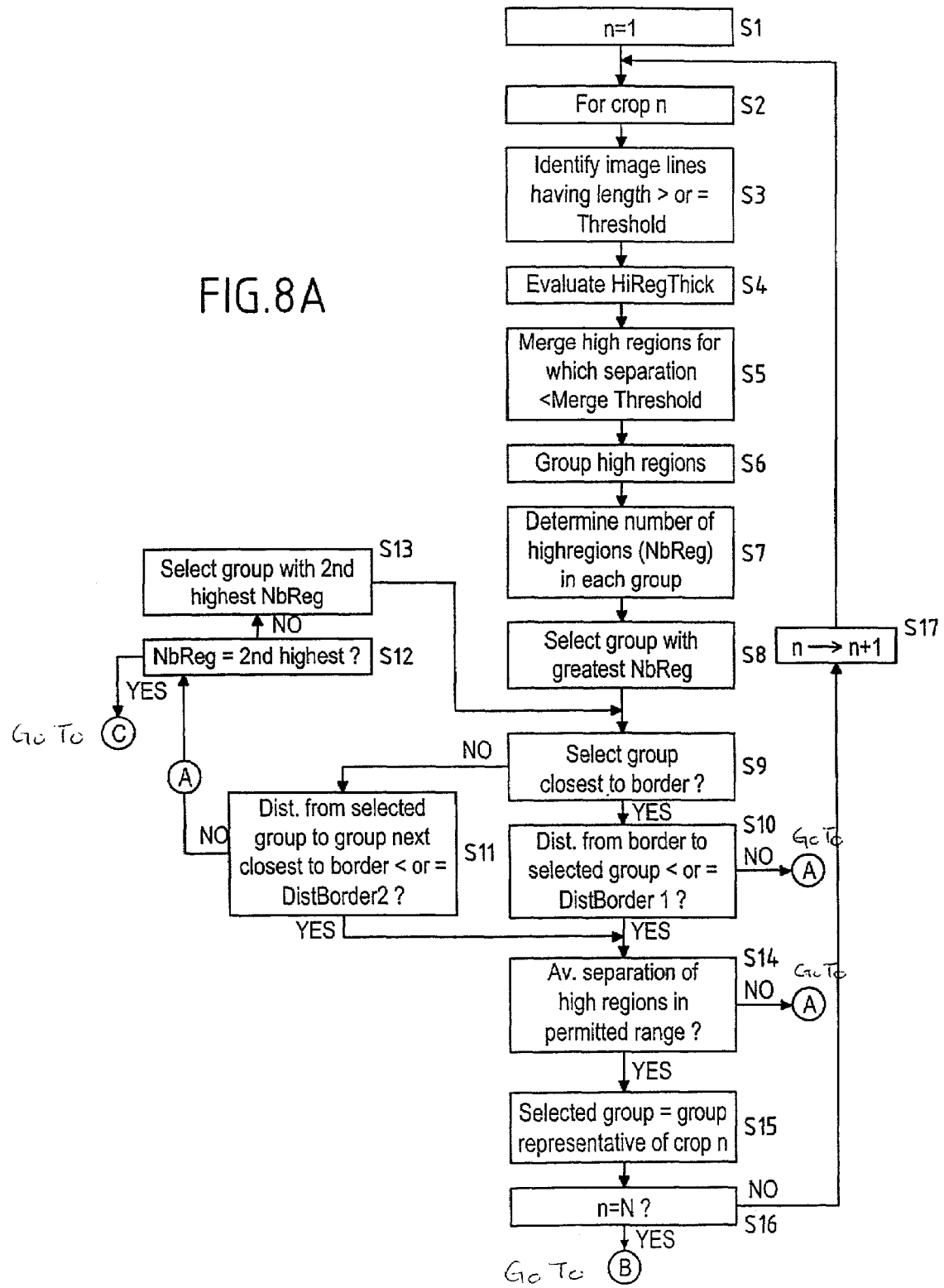
Figure 8B:
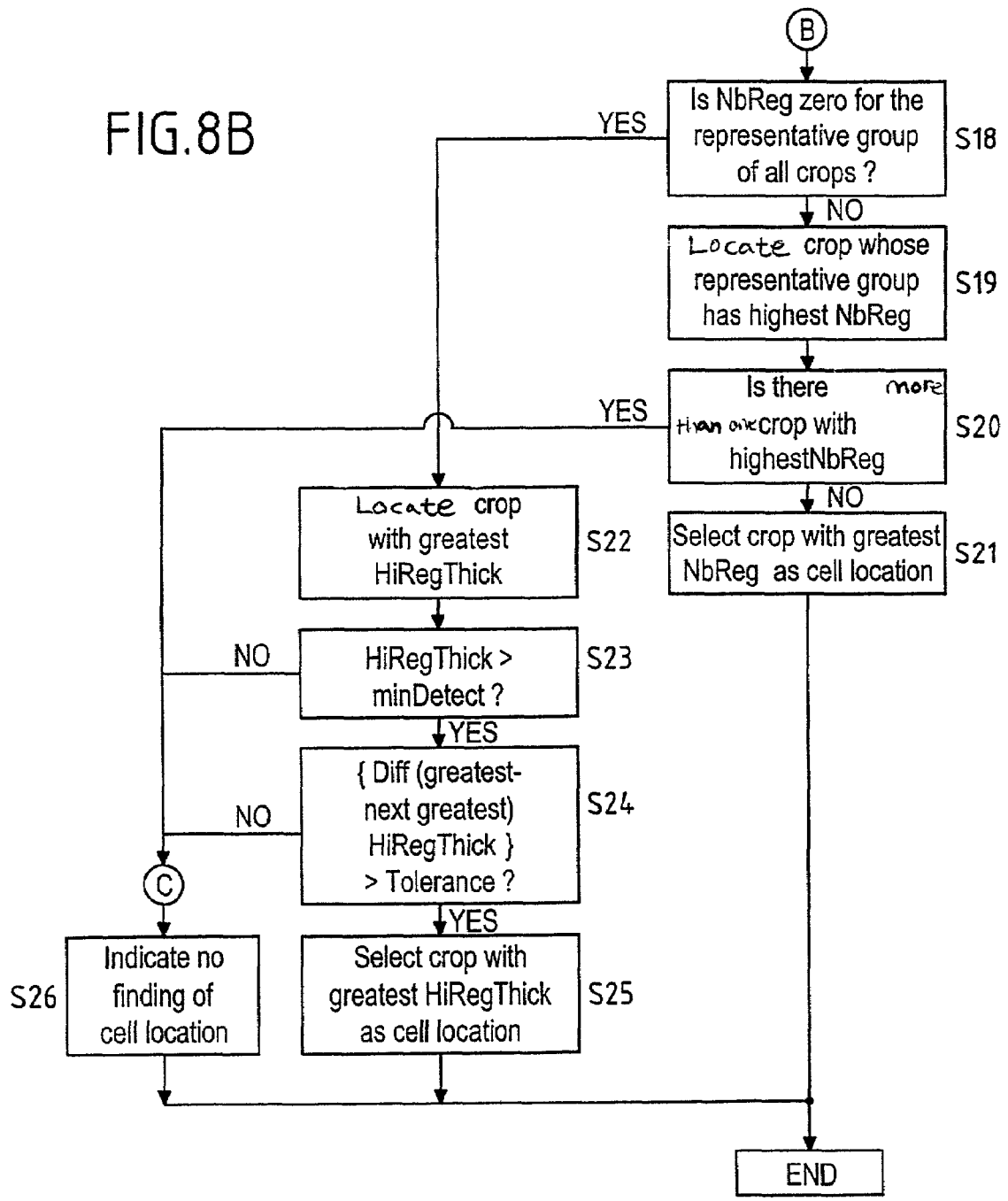

For the first (n=1) of the crops to be analyzed, the projection profile is examined and peaks are identified with respect to a predetermined threshold value (referred to herein as "Threshold"), as in steps S1-S3 of FIG. 8A. In the case of locating a title block in technical drawings where the crop width used for defining the various crops is 18 cm, a suitable Threshold value is determined to be 10 cm. The thus-identified peaks correspond to "long" lines present in the image.

Figure 5:
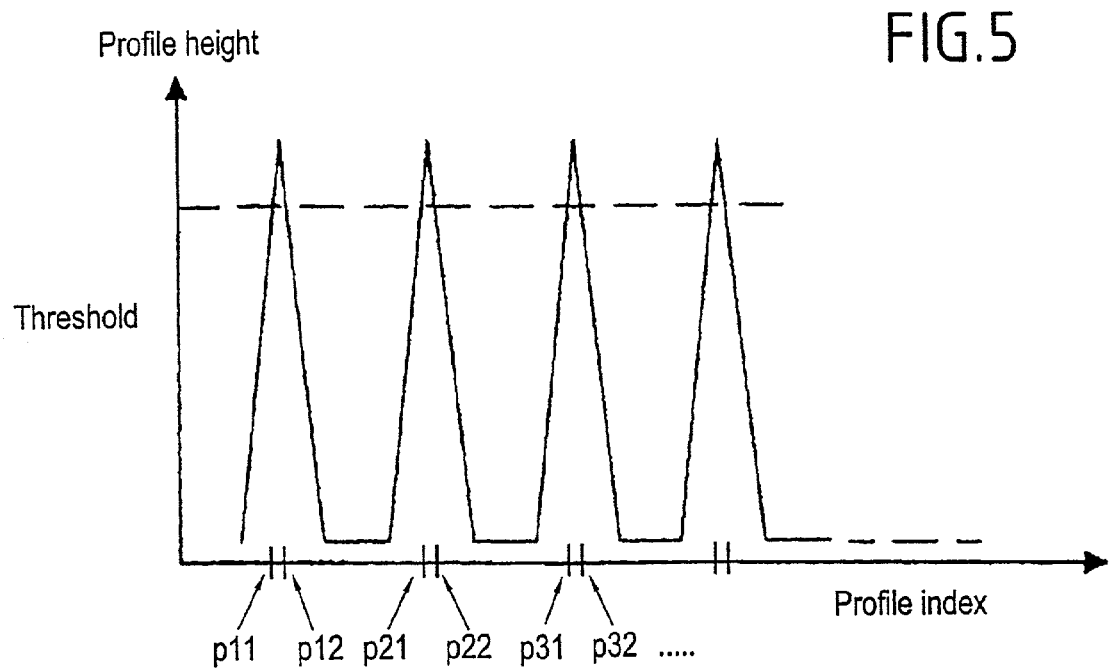
FIG. 5 illustrates how thresholds are applied to peaks in the projection profiles according to a first preferred embodiment of the present invention.
Figure 6:
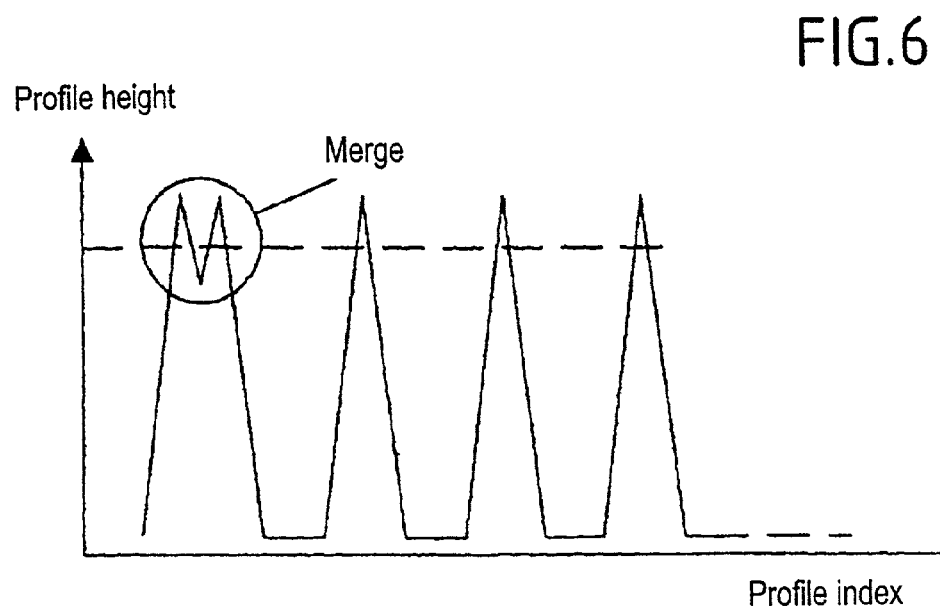
FIG. 6 illustrates how merging is applied to peaks in the projection profiles according to the first preferred embodiment of the present invention.

Next, for each peak, the two locations where the profile crosses the threshold value are determined and these points correspond to the beginning (pi1) and end (pi2) of a "high region" in the profile, as shown in FIG. 5. A list is made of these beginning and end locations. The projection profile, S, can then be represented by this list of beginning and end locations as follows: $S=[(pi1,pi2)]_i$.

A parameter HiRegThick is also evaluated (step S4 of FIG. 8A) and represents the global thickness of the long lines present in this crop of the drawing. HiRegThick for a particular crop is equal to the sum of the widths of the above-threshold areas in the projection profile for that crop, which is represented as: $HiRegThick=\Sigma(pi2-pi1)$.

Sometimes, representation of the projection profile in terms of the list of beginning and end points of the above-threshold areas can mask certain cases where there is a brief dip in the projection profile. Such a case is illustrated by the circled region in FIG. 6. In this case, it is not appropriate to consider the circled pair of peaks as separate discrete high regions, since they have, in fact, portions of a common region. In other words, the pair of high regions really corresponds to a single thick line, rather than two neighbouring thin lines. Thus, in preferred embodiments of the invention, such peaks are merged into a single high region (step S5 of FIG. 8A).

Figure 7:
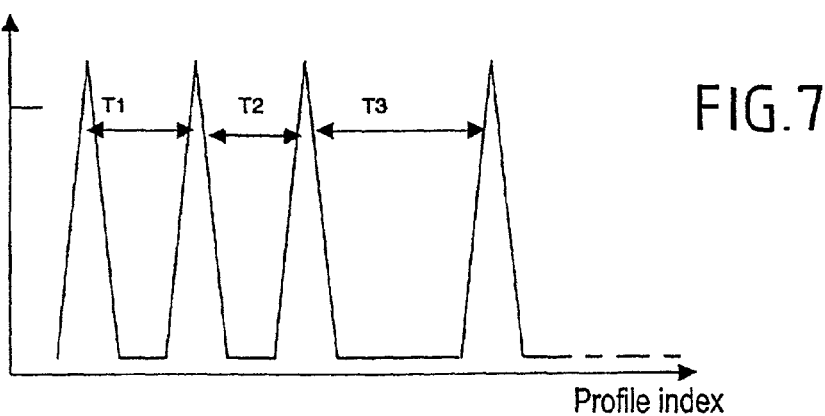
FIG. 7 illustrates how peaks in the projection profiles are grouped according to the first preferred embodiment of the present invention.

As a means for deciding which pair of peaks should be merged into a single high region, a reference value termed herein as "MergeThreshold" can be used. The list of beginning and end locations of high regions is processed to determine a separation T between adjacent high regions as shown in FIG. 7 wherein: Ti=p(i+1)1−pi2, where i≧1. If the separation between a given pair of adjacent peaks is less than the MergeThreshold, then the peaks in question are merged. For example, if a pair of peaks represented by (p21,p22) and (p31,p32) are merged, then the entries (p21,p22) and (p31, p32) in the list are replaced by a single entry having values (p21,p32). Where technical drawings are concerned, a suitable MergeThreshold value is 0.2 cm, for example.

The above-described analysis of projection profiles according to the first preferred embodiment of the invention constitutes a process for detecting relatively long image lines within the various crops of the drawing. Once the long lines have been detected, it has been found to be advantageous, according to the present invention, to define groups of lines (step S6 of FIG. 8A), and to determine which crop comprises the table to be located by reference to one or more parameters of these groups.

When deciding which detected lines (high regions in the projection profile) should be assigned to a given group, the separation T between adjacent peaks is considered once again. This time, two adjacent peaks are considered to belong to the same group if the separation between them is less than a reference value termed herein "PeakGroup". For a given set of peaks, adjacent peaks are considered pair-wise and, provided that the separation between each pair of adjacent peaks is less than PeakGroup, then the entire set of peaks belongs to the same group. For example, all of the peaks illustrated in FIG. 7 would belong to a single group if T1, T2 and T3 were each less than PeakGroup. In this example, T1 and T2<PeakGroup, but T3>PeakGroup, such that only the three left-hand peaks of FIG. 7 belong to a common group. Based on the inventors' findings with regard to the typical height of cells in title blocks of technical drawings (0.5-3 cm), in one embodiment, it is preferable to set PeakGroup to 3 cm. The result of this grouping process is a list of groups of high regions present in each crop.

As mentioned above, each high region corresponds to a relatively long line. Each group thus corresponds to a set of long lines that are pair-wise within a separation of Peak-Group (e.g., 3 cm) from each other. In one embodiment, if the crop corresponds to the title block of the technical drawing, then there should only be one identified group of long lines. However, multiple groups of long lines can be identified for crops that contain certain types of images.

Next, in accordance with the preferred embodiment, one group is selected to be representative of each respective crop by evaluating the number of high regions in each group in steps S7 and S8 of FIG. 8A. Preferably this representative group will be the one that contains the greatest number of high regions (long lines), the number of lines per group being here designated as "NbReg" and evaluated in steps S7 and S8. However, there are circumstances in which it may be preferable to select the group containing the second highest value of NbReg (that is, the second greatest number of high regions). In particular, the first choice group (and second choice group, if necessary) is validated with reference to the distance between that group and the image border. If the selected group is the closest group to the image border, then the distance is compared with a reference value termed herein as "DistBorder1" to determine whether it is less than or equal to DistBorder 1 (steps S9-S10 of FIG. 8A). If the selected group is the second closest group to the image border, then the distance between the selected group and the group most closest to the border is compared with a reference value DistBorder2 to determine whether or not this distance is less than or equal to DistBorder2 (step S11 of FIG. 8A).

If the compared distance at step S11 is greater than the respective reference value, then the selected group cannot correspond to the title block of the drawing and the process proceeds to step S12 at point A in FIG. 8A. Although it is preferable to set DistBorder1 to 3 cm and DistBorder2 to 2.5 cm, other values may be used instead. In step S12, it is determined whether the NbReg of the currently selected group equals the second highest value. If the determination result at step S12 is "NO", then the group with the second highest NbReg is selected (step S13) and the process returns to step S9.

If the two groups containing the greatest number of high regions are invalid (with reference to the above DistBorder2 and average-distance tests), it would, in theory, be possible to select the group having the next greatest number of high regions to represent this crop, provided that this group is valid (with reference to the above DistBorder2 and average-distance tests). However, it has been found that better results are achieved if, instead, it is decided to eliminate the crop in question from consideration as the possible location of the title block (the branch C from step S12 in FIG. 8A).

In preferred embodiments of the invention, a further test is performed to validate the group selected to represent each crop. More specifically, the average distance between high regions in the representative group should be within a predetermined range of values (step S14 of FIG. 8A). This average distance can be compared to the average height of a cell in the title block. Preferably, this average distance should be in the range of 0.5-3 cm (inclusive) if the representative group corresponds to the title block of the technical drawing, but other values may be used instead.

If the group having the highest (or second highest) number of high regions is valid, then that group is selected as the group representative of the crop in question (step S15). Then the process returns to step S2 through steps S16 and S17 for a different crop.

Preferably, the decision as to which crop contains the title block of the drawing is made based upon the properties of the representative group(s) selected for each crop. FIG. 8B shows a flow diagram representing a preferred algorithm for making this decision according to the present invention.

As shown in FIG. 8B, first, it is determined in step S18 whether NbReg is zero for all crops. If "YES", then the process proceeds to step S22; otherwise, in step 19, it is determined whether there exist crops whose representative group has the highest NbReg. Then in step S20, it is determined whether there is more than one such crop. If "yes", then the process proceeds to step S26; otherwise, this single crop is selected as the table location, in step S21, and the decision process ends.

If NbReg is zero for all crops (determined in step S18), then the decision on the table's location is made based on the parameter HiRegThick. The crop having the greatest value of HiRegThick is sought in step S22. This crop will be selected as the table location (in step S25) and the decision process will end, provided that this value of HiRegThick has passed two tests. Namely, the first test (step S23) verifies that HiRegThick is greater than a reference value termed herein "MinDetect". MinDetect represents a measure of the minimum thickness that is likely to be exhibited by the aggregate of the long lines delimiting the cells in a title block. Based upon the inventors' findings, it is preferable to set MinDetect to 0.3 cm, but other values may be used. The second test (step S24) verifies that the difference between the value of HiRegThick for the selected crop and the next highest value of HiRegThick exceeds a value termed "Tolerance". Based upon the inventors' findings, it is preferable to set Tolerance at 50% of the HiRegThick value being tested, but other values may be used.

If the highest value of HiRegThick fails either of the above two tests, then the method returns an indication that no finding could be made with regard to the location of the title block (step S26). Then, it is up to the user to determine the title block location "manually". This is termed a "rejection".

If, in step S20, it is determined that the highest value of NbReg is shared by two or more crops, then it is preferred to indicate, once again, that no finding can be made regarding the location of the title block (step S26).

The above description outlines the major steps of the analysis performed in the preferred embodiments of the invention. The above-described method for locating title blocks in technical drawings can be applied successfully, even in the case of old drawings and drawings in which the title block is partially erased. Tests measuring the reliability of the method are described in greater detail below. However, before presenting the test results, it is appropriate to consider certain pre-processing stages that can be optionally associated with the above-described method steps so as to further improve the reliability and/or speed of the title-block location process of the present invention. The pre-processing preferably includes the following stages:

verification of format (in terms of paper size) and resolution (in terms of dots per inch), a reduction in resolution of the image to be analyzed, deskewing of the image to be analyzed, and detection of a frame or border surrounding the image (such a border or frame is generally present in technical drawings).

It is advantageous to verify the format and resolution of the document to be analyzed for a number of reasons. First, in some cases the information on the drawing will be so bad that no meaningful analysis can be performed. Secondly, it is preferred to define different crops for drawings in A4 format as compared with drawings in A0 to A3 formats (see below). The drawing resolution (in terms of dots per inch), picture height and width are checked and compared with standard values. If the measured surface values are within 25% of standard values, then the drawing is accepted for analysis. Otherwise, the method returns a rejection of the drawing.

Experiments have shown that the speed and reliability of the detection method according to the present invention are both improved if the analysis is performed on an image of the drawing at a reduced resolution. It is believed that the improvement in reliability stems from the reduction process itself, which tends to intensify lines and restore broken lines. Based on the inventors' findings, it is preferable to generate an image of the drawing at a resolution of 50 dots per inch, then to calculate the projection profile, etc. from this reduced-resolution image. However, other resolutions may be used.

Given that the first preferred embodiment of the invention involves analysis of a scanned image of a drawing, misalignment errors (skew) can arise during the scanning process. This reduces the performance of the described method. It is therefore advantageous, but not required, to detect skews and correct them before applying the analysis steps of the present invention. Various algorithms for detecting and correcting skew are available on the market (see, for example, techniques mentioned in "Skew reconstruction based on maximization of variance of transition-counts" by Y. K. Chen and J. F. Wang, in Pattern Recognition 33 (2000), pp. 195-208).

During the pre-processing stages, it is preferred to detect the frame that generally is drawn around the principal drawing. As explained above, information regarding the positioning of the frame is preferably used to validate the choice of representative groups for the crops (by way of the values DistBorder1 and DistBorder2). The preferred method for detecting the frame involves generating horizontal and vertical projection profiles for the edges of the document and analysing these projection profiles so as to find the longest lines in the neighbourhood of the four document edges. If these lines intersect, then they are considered to represent a picture frame. Another method for finding the picture frame involves detecting the largest box present on the document.

If it becomes impossible to detect the frame located around the drawing, then it would be possible to validate the choice of representative group selected for a given crop with reference to the edge of the document rather than with reference to the frame. However, in general, in cases where no frame can be located, it is considered preferable to issue a "rejection", indicating that no location can be specified for the title block.

In the above description of the method according to the preferred embodiments of the invention, the corner crops used to define the various crops, as examples only, had the crop width of 18 cm and the crop height of 13 cm. It has been found advantageous to use corner crops having these dimensions when locating title blocks in documents of A0 to A3 format. However, when locating title blocks in A4 documents, according to one embodiment, it is preferred to use end crops corresponding to the top and bottom ends of the document, giving a crop width of 21 cm (equal to the width of the sheet) and a crop height still of 13 cm.

Figure 9:
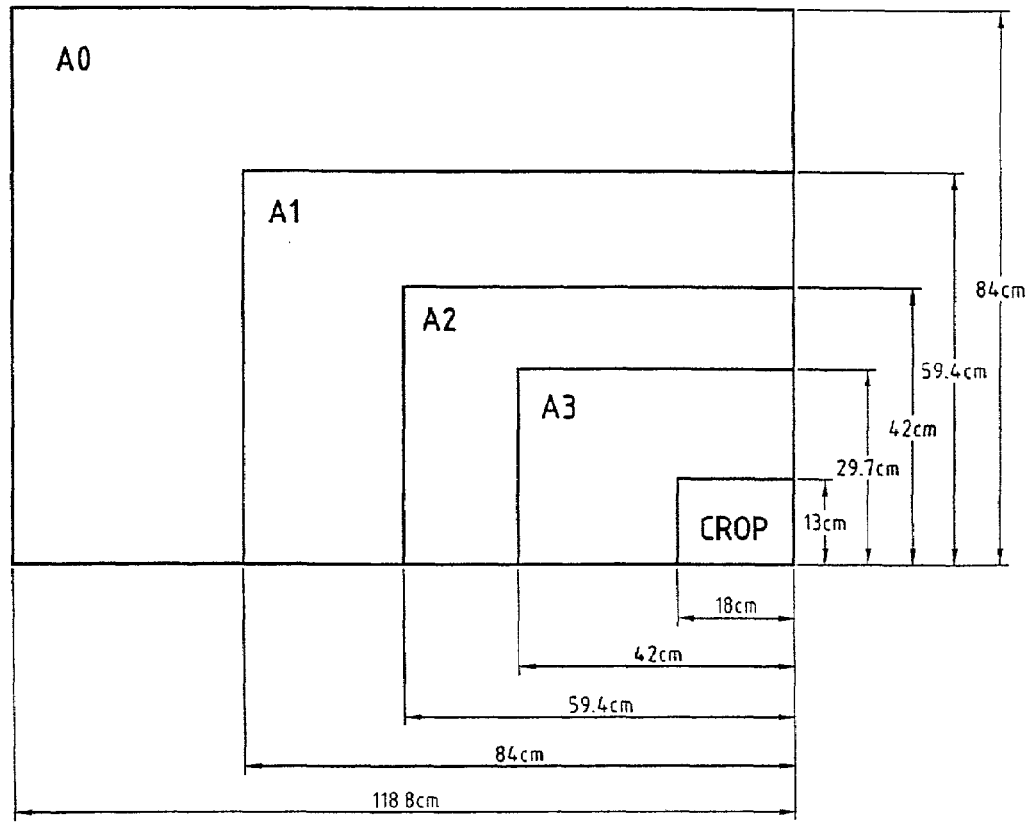
FIG. 9 illustrates how crops within drawings of different sizes can be identified for analysis according to the preferred embodiments of the present invention.
Figure 9:
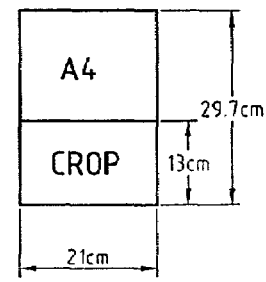

FIG. 9 illustrates examples of preferred crop dimensions with respect to all of the main paper formats for use in the present invention.

In the above-described first preferred embodiment of the invention, lines are detected in the various crops of the document by evaluating the number of image pixels present on lines of a scanned image of the document (generating a projection profile). In a second preferred embodiment of the invention, where the document to be analyzed is represented by data in a vector format (such as HPGL), the corresponding projection profile is generated directly from the vector data, which indicates the lengths and positions of lines in the image, and the thickness of the respective lines. In a third preferred embodiment of the invention, lines on the document to be analyzed are found by the "FAST" method of Chhabra, Misra and Arias, mentioned above. The line data, however it is derived, is processed to determine the location of lines having a length above the above-mentioned Threshold value, and to assign the various lines to one or more groups with reference to the PeakGroup reference value. The value of the parameter HiRegThick is determined by summing the thicknesses of the lines in a given crop. The rest of the processing is substantially the same as that of the first preferred embodiment of the invention, except that the above-mentioned pre-processing stages are not required.

Tests were performed on a database of scanned images of 788 technical drawings, to evaluate the effectiveness of the methods according to the present invention. The scanned drawings were in TIFF format and corresponded to 500 TIFF pictures for the A0 to A3 formats and 288 TIFF pictures for the A4 format. Depending upon the origin of the drawing, the resolution was varied (from 200 to 400 dpi) and there were differences in scan quality. Some drawings had the legend partly erased, some had incomplete main frames due to scan problems and some had black borders. Legend types varied also.

These tests measured the following:
the percentage of title blocks correctly located (termed "recognition rate"),
the percentage of drawings for which the present method did not return a finding for the legend location (termed "rejection rate"), and
the percentage of drawings for which the present method gave an incorrect location for the title block (termed "confusion rate").

These tests were performed to prove the effectiveness of the methods according to the present invention in locating title blocks and to evaluate what effect the deskewing and resolution-reduction pre-processing stages have on the reliability of the method. The test results were obtained using the method of the first preferred embodiment of the invention and are summarized as follows in Table 1.

TABLE 1

| | Recognition rate | Confusion rate | Rejection rate |
|---|---|---|---|
| Without deskewing or reduction | 65% | 1% | 34% |
| With deskewing, without reduction (A4) | 98% | 0% | 2% |
| With deskewing, without reduction (A0–A3) | 80% | 2% | 18% |
| With deskewing and reduction to 50 dpi (A0–A3) | 82% | 2% | 16% |

The above test results show that the method according to the present invention provides reliable indications of the location of title blocks in technical drawings. In particular, there is a very low confusion rate, with an incorrect legend location being indicated in one or fewer cases in 50. Moreover, the tests show that improvements in recognition rates can be obtained by applying deskewing and resolution-reduction to the scanned images that are analyzed. It was also found in the tests that reducing resolution to 50 dpi reduced the processing time for an A0 document from around 5 seconds to less than 1 second.

A closer study of the above tests results obtained when deskewing was applied (but no reduction in resolution) showed that, for the drawings in A4 format, many of the cases where the method failed to provide an indication of title block location were due to the presence of a black border in the scanned image. Black borders also caused some confusion for some drawings in A0–A3 format. For drawings in A0–A3 format, rejections mainly arose in the case of old drawings having strange title blocks. For these drawings, other causes of confusion were: the presence, in the top-left or bottom-right corner of the drawing, of tables having more guidelines than were present in the title block; scan imperfections in the drawings (leading to bent or broken lines); and partially erased legends in the drawings (although, in the vast majority of such cases, this leads to rejection rather than confusion).

When both deskewing and reduction in resolution are applied, recognition rate improvements were seen for drawings in all formats. Confusions were mostly due to tables appearing in the corner opposite to the legend.

Further tests were conducted in which the resolution reduction was to 100 dpi rather than to 50 dpi. Although this gave rise to a slight improvement in recognition rates, the effect was not significant.

Still further tests were conducted to determine whether or not it would be feasible to base the decision on which crop contains the title block solely upon the parameter HiRegThick, with or without conditions that set the range of acceptable values for this parameter. These tests showed that either the recognition rate was reduced and/or the confusion rate was unacceptably increased.

All of the above-described tests involved implementation of the method according to the present invention by a computer program written in a script language on top of an image library in C++. It is envisaged that further improvements may be made in the processing speed by rewriting the program entirely in C++. Additional improvements would be obtained by adding a black-border removal algorithm as a further pre-processing stage as part of the present invention.

Although the present invention has been described with reference to specific preferred embodiments thereof, it is to be understood that numerous variations and modifications can be made without departing from the invention.

For example, in the preferred embodiments of the invention, crops corresponding to the corners or ends of a scanned document are analyzed. The decision to analyze only the corners or ends of the document is advantageous in the case of locating title blocks in technical drawings on the grounds that it speeds up the process, since the title blocks are generally located in one corner. However, there are circumstances in which it may be preferable to analyze crops corresponding to other portions of the document, even to the extent that the set of crops covers the whole of the document, which is part of the present invention.

Moreover, it may not always be appropriate to evaluate the number of black pixels present along the lines of the analyzed crop, as in the first preferred embodiment. If the image is rendered in negative, then it would be more appropriate to count white pixels. For color documents, it might be preferable to evaluate the numbers of pixels of some color other than black. In general, it is desirable to count image pixels, that is the pixels making up the image and not the pixels of the background color of the medium on which the drawing is presented.

Moreover, the above description of the preferred embodiments of the invention presented a combination of specific method steps and parameter values. It is to be understood that the present invention is not limited to this specific combination of features. More particularly, these features are separable and can be combined in different sub-combinations.

The techniques of the present invention will usually, but not exclusively, be applied to representations of documents such as scanned images of documents, vector representations of the images present on documents, etc.

The invention claimed is:

1. A method of automatically locating a table in a document, the method comprising the steps of:
defining a plurality of crops of the document where at least one crop corresponds to a corner of the document;
for each crop of the document, determining the location of lines whose length is greater than or equal to a predetermined threshold value;
evaluating at least one parameter indicative of the density of said lines; and
deciding, based on said at least one evaluated parameter, which one of said plurality of crops includes the location of said table,
wherein the evaluating step includes defining groups of said lines, two or more adjacent lines being allocated to a common group if a separation between adjacent ones of said two or more lines is less than a reference value, the common group corresponding to a set of lines; and
wherein the deciding step includes the step of evaluating at least one parameter of the groups of lines defined for the different crops.

2. The automatic table-locating method of claim 1, wherein the document is a technical drawing.

3. The automatic title-block locating method of claim 2, wherein said plurality of crops correspond to respective corners of the document.

4. The automatic table-locating method of claim 2, wherein:
the evaluating step includes defining groups of said lines, two or more adjacent lines being allocated to a common group if a separation between adjacent ones of said two or more lines is less than a reference value; and
wherein the deciding step includes the step of evaluating at least one parameter of the groups of lines defined for the different crops.

5. The automatic table-locating method of claim 1, wherein the deciding step includes the steps of:
for each crop, evaluating the number of said lines in each group and performing a validation test on the group;
for each crop, designating, as a representative group, the group having the greatest number of lines and passing the validation test; and
selecting one of the crops as having the location of the table, the selected crop including the representative group having the greatest number of lines.

6. The automatic table-locating method of claim 5, wherein the performing step comprises the step of evaluating a separation between adjacent lines within the group.

7. The automatic table-locating method of claim 1, further comprising a preliminary step of verifying the format of the document to be analysed.

8. The automatic table-locating method of claim 1, wherein the document is an image of a document produced at a reduced resolution.

9. The automatic table-locating method of claim 1, wherein the document is a scanned image of a document, and the method further comprises the step of deskewing the scanned image before applying the method.

10. An apparatus for automatically locating a table in a document by application of the method according to claim 1.

11. The apparatus of claim 10, wherein said plurality of crops correspond to respective corners of the document.

12. A method of automatically locating a table in a document, the method comprising the steps of:
defining a plurality of crops of the document;
for each crop of the document, determining the location of lines whose length is greater than or equal to a predetermined threshold value;
evaluating at least one parameter indicative of the density of said lines; and
deciding, based on said at least one evaluated parameter, which one of said plurality of crops includes the location of said table,
wherein the evaluating step includes defining groups of said lines, two or more adjacent lines being allocated to a common group if a separation between adjacent ones of said two or more lines is less than a reference value, the common group corresponding to a set of lines;
wherein the deciding step includes:
evaluating at least one parameter of the groups of lines defined for the different crops,
for each crop, evaluating the number of said lines in each group and performing a validation test on the group,
for each crop, designating, as a representative group, the group having the greatest number of lines and passing the validation test, and
selecting one of the crops as having the location of the table, the selected crop including the representative group having the greatest number of lines; and
wherein the performing step comprises the step of evaluating a distance of the group from a border on the document.

13. The automatic table-locating method of claim 12, wherein the performing step comprises the step of evaluating a separation between adjacent lines within the group.

14. The automatic table-locating method of claim 12, further comprising the step of evaluating a sum of thicknesses of said lines for each crop; and wherein, in the event that there is no crop having a representative group with the greatest number of lines, the deciding step includes the steps of:
determining whether there is a crop having an evaluated thickness sum that is significantly greater than a corresponding evaluated thickness sum for the other crops; and
if so, designating that crop as the location of the table and, if not, generating a signal indicative of failure to locate the table.

15. An apparatus for automatically locating a table in a document by application of the method according to claim 12.

16. A method of automatically locating a table in a document, the method comprising the steps of:
defining a plurality of crops of the document;
for each crop of the document, determining the location of lines whose length is greater than or equal to a predetermined threshold value;
evaluating at least one parameter indicative of the density of said lines; and
deciding, based on said at least one evaluated parameter, which one of said plurality of crops includes the location of said table,
wherein the evaluating step includes defining groups of said lines, two or more adjacent lines being allocated to a common group if a separation between adjacent ones of said two or more lines is less than a reference value;
wherein the deciding step includes:
evaluating at least one parameter of the groups of lines defined for the different crops, for each crop, evaluating the number of said lines in each group and performing a validation test on the group, for each crop, designating, as a representative group, the group having the greatest number of lines and passing the validation test, and selecting one of the crops as having the location of the table, the selected crop including the representative group having the greatest number of lines;

wherein the performing step comprises the step of evaluating a separation between adjacent lines within the group; and wherein the method further comprises the step of evaluating a sum of thicknesses of said lines for each crop; and wherein, in the event that there is no crop having a representative group with the greatest number of lines, the deciding step includes the steps of:

determining whether there is a crop having an evaluated thickness sum that is significantly greater than a corresponding evaluated thickness sum for the other crops; and if so, designating that crop as the location of the table and, if not, generating a signal indicative of failure to locate the table.

17. An apparatus for automatically locating a table in a document by application of the method according to claim 16.

18. A method of automatically locating a table in a document, the method comprising the steps of:

defining a plurality of crops of the document;

for each crop of the document, determining the location of lines whose length is greater than or equal to a predetermined threshold value;

evaluating at least one parameter indicative of the density of said lines;

deciding, based on said at least one evaluated parameter, which one of said plurality of crops includes the location of said table; and determining the location of a frame present on the document and defining a border on the document, wherein the evaluating step includes defining groups of said lines, two or more adjacent lines being allocated to a common group if a separation between adjacent ones of said two or more lines is less than a reference value, the common group corresponding to a set of lines; and wherein the deciding step includes the step of evaluating at least one parameter of the groups of lines defined for the different crops.

19. An apparatus for automatically locating a table in a document by application of the method according to claim 18.

* * * * *